May 9, 1939.  J. L. SHROYER  2,157,355
PEDAL DEPRESSOR
Filed June 9, 1937  2 Sheets-Sheet 1
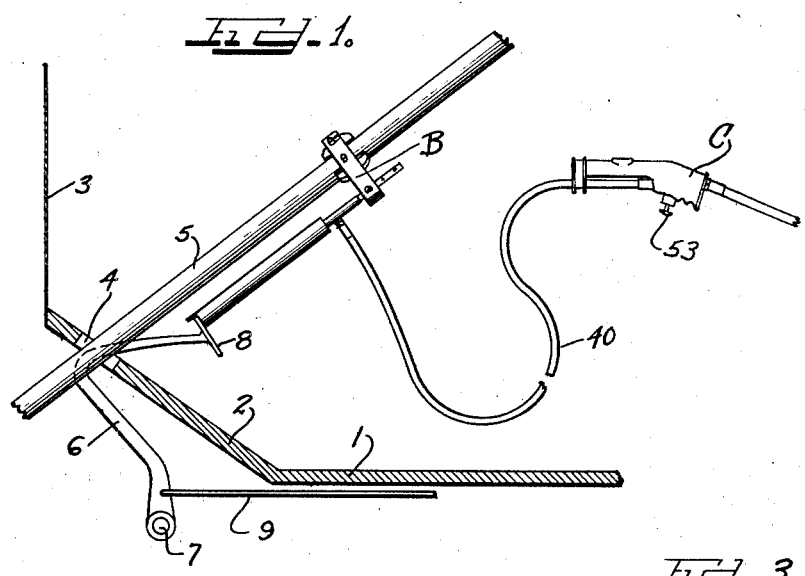
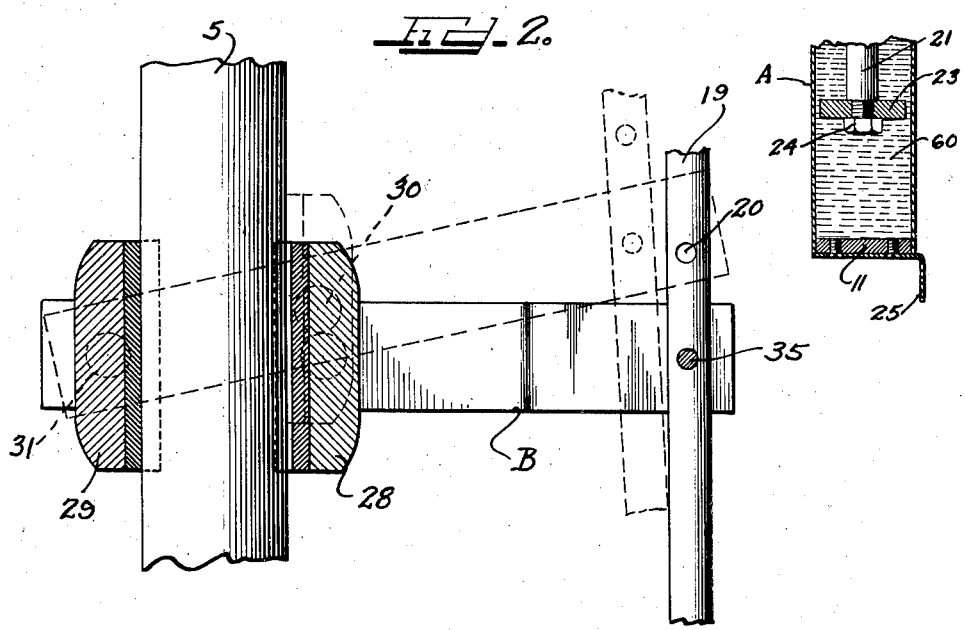
Inventor
JACOB L. SHROYER.

May 9, 1939.　　　J. L. SHROYER　　　2,157,355
PEDAL DEPRESSOR
Filed June 9, 1937　　　2 Sheets-Sheet 2
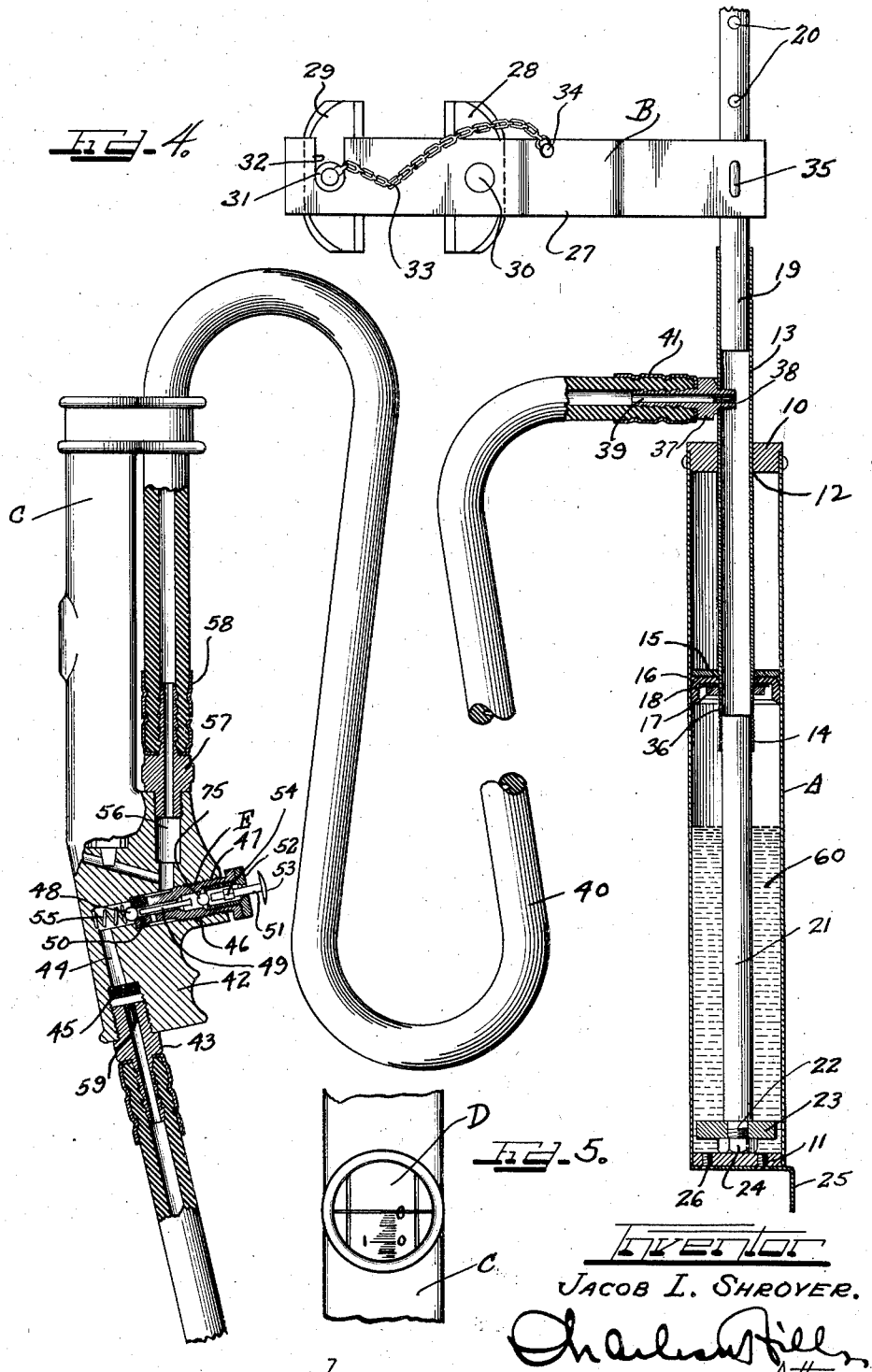

Patented May 9, 1939

2,157,355

UNITED STATES PATENT OFFICE 2,157,355

PEDAL DEPRESSOR

Jacob L. Shroyer, Oak Park, Ill.

Application June 9, 1937, Serial No. 147,179

12 Claims. (Cl. 74—512)

The present invention relates to a pedal depressor and is concerned with a device which may be applied to the brake pedal of an automotive vehicle, for setting the brakes, while the brakes are being tested for relative adjustment as well as for effectiveness of braking action.

In connection with the testing of brakes of automotive vehicles, to secure proper relative adjustment of the brakes of the several wheels, as well as to test the effectiveness of the braking action, it is necessary to actuate the brake pedal to set the brakes.

It is desirable under brake testing operations to know the amount of force being applied to the brake pedal in order to properly adjust the brakes.

In automotive vehicles equipped with four wheel brakes, it is essential that the two brakes on the rear wheels act with equal force and that the brakes on the two front wheels act with equal force, and with the forces acting on the front and rear wheels usually different.

To successfully accomplish adjustment of the brakes of an automotive vehicle, it is desirable that the amount of pressure applied to the brake pedal be known and that it be the same for successive trials necessarily involved to complete a test.

Where the brake pedal is depressed by a foot of an individual, the amount of pressure is not known and furthermore to use a person for such purposes involves additional expense in a testing operation.

It is desirable, therefore, to provide an attachment whereby the brake pedal may be depressed during brake testing operations and so regulated that in the event the attachment should accidentally become dislodged from the pedal no damage to the floor portion of the vehicle is caused. Furthermore, it is desirable that such an attachment be arranged to indicate the amount of pressure being utilized against the brake pedal.

It is an object of the present invention to provide an attachment which may be used in connection with the testing of automotive vehicle brakes for depressing the brake pedal in which the amount of pressure applied to the pedal may be readily indicated.

Another object of the present invention is to provide a pedal depressor, operated by fluid pressure to actuate the pedal to set the brakes wherein the pressure utilized may be indicated, and in which damage to the floor of the vehicle is prevented in the event the attachment is dislodged from the pedal.

Another object of the present invention is to provide a pressure actuated pedal depressor having means for preventing sudden movement of the parts in the event the depressor is dislodged from a brake pedal.

A still further object of the present invention is to provide a pedal depressor for use in connection with the testing of automotive vehicle brakes which attachment may be readily applied to the steering post of the vehicle, quickly and in such manner as to be effectively locked to such post with minimum effort. Another and still further object of the present invention is to provide a pedal depressor for use in connection with the testing of automotive vehicle brakes, which depressor is provided with means for securing it to the steering post of a vehicle being tested, which means are readily adaptable to fix one end of the depressor to the post irrespective of the size of the post.

The above, other and further objects of the present invention will be apparent from the following description and accompanying drawings.

The accompanying drawings illustrate an embodiment of the present invention and the views thereof are as follows:

Figure 1 is a view, partially in elevation and partially in section, showing a fragmental portion of the steering post of an automotive vehicle, a portion of the floor and dashboard of the vehicle and showing the attachment of the present invention applied to the post and against the brake pedal of the vehicle, with the parts in normal position prior to the actuation of the device to set the brakes.

Figure 2 is a fragmental, enlarged view partially in elevation and partially in section, showing the preferred manner of removably securing one end of the pedal device to the steering post of an automotive vehicle, showing in full line the relationship of the parts when the device is applied to the post and in dotted lines, the position assumed when fluid pressure has been applied to the device and the parts locked or clamped against the steering post.

Figure 3 is a fragmental axial sectional view through the pedal end of the cylinder of the present invention showing the pedal head of the cylinder moved away from the stop within the cylinder under the influence of fluid pressure medium admitted to the interior of the cylinder.

Figure 4 is a view, partially in elevation and partially in section showing the pedal depressor of the present invention with means, including a gauge for admitting fluid pressure medium to the interior of the cylinder.

The parts are illustrated when the depressor is in normal position prior to the admission of fluid pressure medium to the interior of the cylinder.

Figure 5 is a fragmental plan view of the gauge utilized in connection with the present invention and showing the appearance of the gauge when there is no pressure within the cylinder of the depressor attachment.

The drawings will now be explained:

In Figure 1 a fragmental portion of the horizontal parts of the floor is represented as 1, the inclined portion as 2 and a part of the dashboard at 3.

As is usual practice, the inclined portion 2 is apertured at 4 to provide an opening through which the steering post 5 passes. The brake pedal 6 is shown as pivoted on a cross shaft 7 suitably secured to the frame structure of the vehicle. This brake pedal as usual, passes through a suitable opening in the inclined portion 2 of the floor and at its upper end is provided with a pad 8 to serve as a rest for a foot of the operator. A pull rod 9 is connected at one end to the pedal 6 and at the other end to the brake rigging of the vehicle, as is common practice.

The pedal depressor of the present invention includes a tubular cylinder A closed at one end by a head 10 and at the other end by a head 11.

The head 10 is centrally apertured at 12, through which aperture extends a tube 13 slidable through the head 10. The tube 13 extends part way of the length of the cylinder A and at its inner end is threaded at 14.

A piston, including a disc 15 which is threaded on the inner end of the tube 13 is thus fixed to the tube. Against the disc 15, a cup washer 16 is secured by means of a threaded ring 17, threaded onto the end 14 of the tube 13 and tightened against a disc washer 18 interposed between the cup washer 16 and the threaded ring 17.

The structures 15, 16, 17 and 18 constitute a piston within the cylinder A which is fixed to the tube 13 and which is disposed nearer the head 10 of the cylinder.

Secured in the outer end of the tube 13 as by welding or other suitable means, is a rod 19 which is provided with a plurality of openings 20 for a purpose to be later explained.

Secured within the inner end of the tube 13 and thus within the cylinder A is a second rod 21 which is welded or otherwise fastened to the inner end of the tube 13.

The other end of the rod 21 is reduced in diameter as at 22 which part is threaded, over which is applied a disc 23 and secured in position thereon by means of a nut 24.

The rod 21 constitutes a stop for limiting the extent of movement of the head 11 of the cylinder toward the piston.

Attached to the exterior of the head 11 of the piston is an L-shaped bracket 25 for hooking engagement over the pad 8 of a brake pedal as may be observed in Figure 1. This bracket is secured to the head 11 by means of screws 26 or other suitable fastening means.

For securing the attachment to the steering post of an automotive vehicle, for brake tests, two straps B are utilized. These straps are similar in shape and are made from flat stock, with intermediate portions 27 secured together in any suitable manner, such, for example, as by welding. At similar ends, the straps straddle the rod 19 and are thereto pivoted, as by a suitable pin, such as the cotter pin 35. The other ends of the straps are laterally spaced to engage about a steering post and to receive between them the shoes 28 and 29 in a manner to contact opposite portions of the steering post 5 when the straps are shifted as later described.

The faces of the shoes 28 and 29 which engage the steering post 5 are concave in cross section so as to fit about the post in substantial surface engagement. The shoe 28 is secured by means of a pivot 30 to the strap B, near the portion 27 of the strap, so as to rock when applied to a steering post.

The shoe 29 is mounted on a stud 31 which enters slots 32 in the two straps to contact a portion of the steering post opposite to the shoe 28. In order to prevent loss of the shoe 29, it is secured as by means of a chain 33 to one of the straps, as by means of a rivet 34.

The straps are pivotally connected to the rod 19 by means of a cotter pin 35 which passes through registering apertures in the strap B and through one of the apertures 20 in the rod 19.

The tube 13 has an aperture 36 opening between the interior of the tube and the interior of the cylinder A between the piston and the head 11 of the cylinder. As illustrated this aperture is disposed close to the piston.

In order to admit a fluid pressure medium such as air to the interior of the cylinder A, a nipple 37 is secured to the tube 13, outwardly of the head 10 of the cylinder and which nipple is provided with a bushing 38 having a restricted opening through it. The nipple 37 has a passageway 39 in which the bushing 38 is interposed and which passageway 39 is of greater diameter than the opening or orifice through the bushing.

A hose 40 is applied over the nipple and secured thereto by means of a metallic ferrule 41 surrounding the hose and clamping it to the nipple, as is common practice.

The other end of the hose is connected to a valve device C which includes a gauge D and a valve structure E for regulating passage of fluid through the hose 40 into the cylinder A.

The valve structure C includes a body portion 42 which has a passage through it for a fluid pressure medium. A nipple 43 is threaded into the body in communication with a duct 44. The body is counterbored to receive a filter 45 for removing certain articles from the pressure medium.

The valve structure E includes a casing 46, which is hollow and which is threaded into an aperture 47 in the body. A ball valve 48 carried on a stem 49 seats against apertured disc 50 at one end of the body of the valve, the stem extending into the body of the valve.

Another stem 51 extends through a cap 52 and at its outer end has a thumb button 53. Formed on the stem within the cap 52 is an enlargement 54 to prevent displacement of the stem outwardly of the cap. Working within the hollow portion of the valve body is a ball 75.

As illustrated, the valve structure E is inserted in the body with respect to the duct 44. When the valve structure E is inserted, a spring 55 bottomed in the body normally bears against the ball 48 for maintaining it seated against the disc 50.

Communicating with another bore 56 of the body 42 is a nipple 57 to which the other end of the hose 40 is connected, as by a ferrule 58.

The nipple 43 is provided within its bore with a bushing 59 having an aperture of small diameter through it to serve as a restriction for the entry of fluid pressure medium into the body 42 of the valve structure C.

When the depressor attachment is assembled, a liquid such as oil and designated by the reference 60, Figure 4, is put within the cylinder A, between the piston and the head 11 of the cylinder. This liquid acts as a plunger to move the head 11 of the cylinder away from the piston when fluid pressure medium is admitted to the interior of the cylinder.

Because of the presence of the disc 23 on the rod 21, the action of the fluid pressure medium against the liquid plunger 60 causes a slow movement of the head 11 away from the piston, as the disc 23 constitutes a restriction for the passage of this liquid.

This feature is desirable in the event the cylinder A should be accidentally dislodged from the brake pedal 6 while fluid under pressure is present within the cylinder.

If some provision were not made to prevent rapid movement of the cylinder with respect to the piston in the event the cylinder is dislodged from the pedal, the cylinder might be projected through the floor portions 2 and thus damage them.

The provision of the restrictive means above described prevents this as in the event the cylinder were displaced from the pedal while fluid under pressure were present within the cylinder, release of end pressure against the head 11 of the cylinder would not allow immediate projection of the cylinder. The presence of the medium under pressure within the cylinder in such event, would strike against the liquid plunger 60 tending to force it against the head 11 of the cylinder to move it away from the piston. However, because of the restriction between the disc 23 and the cylinder A, this cannot occur to such an extent as to suddenly project the cylinder against the floor boards of the vehicle.

In attaching the depressor of the present invention to a vehicle for test purposes, the shoe 29 is removed from the strap B, and the strap moved to straddle the steering post 5, with the shoe 28 against a portion of the post. The shoe 29 is thereupon inserted in the slot 32 on the opposite side of the post as may be seen in Figs. 1 and 2. The head 11 with its bracket 25 is then applied to the pad 8 of the brake pedal and the thumb button 53 of the valve structure C manipulated to open passageway for the fluid pressure medium to the hose 40.

Referring to Fig. 4, it will be observed that the fluid pressure medium enters the duct 44 and then through the aperture in the disc 50 when the ball 48 is displaced from against the disc thence into the bore 56 and the hose 40, into the tube 13 thence through the hole 36 into the interior of the cylinder between the piston and the head 11.

The first result is that relative movement between the piston and the head 11 of the cylinder is created which tends to move the tube 13 and rod 19 upwardly as viewed in Figs. 1 and 4, to tilt the straps B and thus lock the shoes 28 and 29 against the steering post 5 as may be viewed in Fig. 2 thereby fixing the rod 19 and tube 13 against further movement. Continued pressure of the medium against the liquid plunger 60 will then move the head 11 of the cylinder away from the piston, depressing the brake pedal 6. The amount of pressure required to effect such movement is shown on the dial D of the valve structure C. When sufficient pressure has been admitted to the cylinder A to make the first test of the brakes, pressure on the button 53 is relieved whereupon the spring 55 seats the ball 48 thus cutting off admission to the hose 40 and trapping the medium in the cylinder A.

A test is then made of the brakes of the vehicle under this pressure. If it should happen that the brakes are maladjusted then pressure against the head 11 of the cylinder may be relieved by pushing the thumb button 53 partially inwardly which will then open the interior of the valve casing E to the atmosphere, the air escaping around the stem 51. The brake may then be adjusted and additional air admitted to the cylinder until the same pressure as before is reached whereupon another test of the brakes may be made.

In this fashion a depressor may be utilized for applying any desired pressure against the brake pedal. It sometimes happens that a proper test of the brake mechanism of an automotive vehicle requires tests at different pressures, that is to say, one test may be made with pressure of 10 pounds, a second test with a pressure of 20 pounds and a third test with a pressure of 30 pounds.

The provision of the structure herein described makes possible the application of any desired pressure to a brake pedal and the repeated applications of the same pressure for carrying out various steps in the testing of the brake mechanism of the vehicle.

As hereinbefore explained one purpose of the present invention is to provide means for applying predetermined pressure to the brake pedal of an automotive vehicle while the brakes are being tested.

The construction of the device as herein explained causes slow movement of the cylinder to prevent any kick-back if the air pressure should jump, or if the cylinder should slip off with the brake pedal during a test.

The invention has been described herein more or less precisely as to details, yet it is to be understood that the invention is not to be limited thereby as changes may be made in the arrangement and proportion of parts, and equivalents may be substituted, without departing from the spirit and scope of the invention.

The invention is claimed as follows:

1. In a brake pedal depressor of the type wherein a cylinder and piston rod are relatively moved by a fluid under pressure admitted to the cylinder, characterized by a liquid column in the cylinder which acts against one head of the cylinder responsive to fluid admitted to the cylinder to separate said piston and said one head to depress a pedal, and further characterized by means immersed in the liquid to dampen the action of the liquid column with respect to the relative movements of the cylinder and piston rod.

2. In a brake pedal depressor, the combination of a cylinder having heads at both ends, a piston rod in the form of a tube extending outwardly through one head of the cylinder, a piston fixed to said tube within the cylinder, means for admitting fluid under pressure through said tube and into said cylinder at a point between said piston and the other head of said cylinder, and a liquid column within said cylinder between said piston and the other head of said cylinder for dampening the relative movement of the cylinder and piston as said fluid under pressure urges said cylinder in a direction to depress the pedal.

3. In a brake pedal depressor, the combination of a cylinder having heads at both ends, a piston rod in the form of a tube extending outwardly through one head of the cylinder, a piston fixed to said tube within the cylinder, means for admitting fluid under pressure through said tube and into said cylinder at a point between said piston and the other head of said cylinder, a liquid column within said cylinder between said piston and the other head of said cylinder and movable with said cylinder by said fluid under pressure for urging said cylinder in a direction to depress the pedal, and means in the path of movement of said liquid column for dampening the rate of movement of said cylinder with respect to said piston.

4. In a brake pedal depressor, the combination of a cylinyder having heads at both ends, a piston rod in the form of a tube extending outwardly through one head of the cylinder, a piston fixed to said tube within the cylinder, means for admitting fluid under pressure through said tube and into said cylinder at a point between said piston and the other head of said cylinder, and a rod fixed at one end to said tube and extending towards the other head of said cylinder to limit the approach of said other cylinder head towards said piston.

5. In combination a cylinder having heads at its ends, a piston rod in the form of a tube projecting through one head, a piston fixed to said tube within said cylinder, means for limiting the approach of said other cylinder head towards said piston, means constituting a liquid column working between said piston and the other cylinder head and of less axial length than the axial distance between said piston and other cylinder head when said head is at its limit of approach to said piston, means for admitting fluid under pressure through said tube and into said cylinder between said piston and said liquid column, a rod fixed at one end to the inner end of said tube and extending towards the other cylinder head with its other end constituting a limit stop, and a disc on said rod near its other end for reducing the volumetric cross section of said cylinder at said rod end to retard the rate of movement of said liquid column under action of said fluid under pressure.

6. In combination, a cylinder having heads at its ends, a piston rod in the form of a tube projecting through one head, a piston fixed to said tube within said cylinder, a liquid column working between said piston and the other cylinder head, means for admitting fluid under pressure through said tube and into said cylinder between said piston and said liquid plunger, a rod fixed at one end to the inner end of said tube and extending towards the other cylinder head with its other end constituting a limit stop, and means carried by said rod near its said other end for dampening the movement of said liquid column in either direction of cylinder movement.

7. A pedal depressor comprising in combination two cooperating telescopically arranged members relatively endwise movable, one of said members being adapted for engagement with a brake pedal, the other of said members carrying separate and relatively movable tiltable clamping means for frictionally engaging opposite portions of the steering column to prevent endwise movement of said other member when said means are clamped to the column, and means admitting fluid under pressure through one of said members into the other of said members for causing endwise movement of said members in a direction to elongate said device to tilt said clamping means into clamped engagement with the steering column and depress said pedal.

8. In a pedal depressor, in combination, means including two relatively movable shoes adapted to frictionally clamp opposite portions of a steering column, means adapted to engage a brake pedal, and fluid pressure means to effect movement of said members in opposite directions to depress said pedal and cause clamping action of said first means.

9. In a device of the class described, means for clamping said device to the steering column of an automotive vehicle, said means including two shoes engageable with opposite portions of a steering column and being relatively longitudinally shiftable along the column, straps straddling the column and pivotally supporting said shoes, a cylinder and a piston rod working in the cylinder in relatively endwise movable relation, said straps being pivotally connected to said rod and tiltable to set up relative longitudinal movement of said shoes to force them into frictional holding engagement with the steering column when said rod is moved outwardly of the cylinder, means for connecting the cylinder to a brake pedal, and means for admitting fluid under pressure to the interior of said cylinder to move the cylinder and piston in the manner stated, said shoes being released when said rod is moved into the cylinder on release of the fluid pressure.

10. A device for holding the foot brake pedal of an automotive vehicle in brake-applying position comprising in combination, a bracket, shoes carried by said bracket for clamping opposite portions of the vehicle steering column when the bracket is tilted in one direction, a cylinder, a piston rod working in said cylinder, said bracket being connected to said rod outwardly of said cylinder, said cylinder having an end adapted for engagement with a brake pedal, and means for admitting fluid under pressure to said cylinder to depress the pedal and move said rod outwardly of the cylinder the movement of said rod in the manner stated causing tilting of said bracket to effect clamping engagement of said shoes with the steering column.

11. A device for depressing the brake pedal of an automotive vehicle for testing the vehicle brakes, comprising a cylinder having heads at both ends, a piston rod in the form of a tube slidably projecting through one of said heads and carrying a piston within the cylinder, the other of said heads being provided with means for connection to the brake pedal, a bracket pivotally connected to said tube outwardly of said one head, shoes carried by said bracket for clamping opposite portions of the vehicle steering post when the bracket is tilted to hold said piston rod or tube against movement in one direction, means for admitting fluid under pressure through said tube into said cylinder for extending the cylinder and pitson rod, the construction and operation being such that admission of fluid under pressure into said cylinder will first shift the piston rod outwardly to tilt said shoes into holding engagement with the post to check further movement of the piston rod and then with the piston rod checked cause movement of the cylinder along the piston rod to depress the pedal.

12. A device for depressing the brake pedal of an automotive vehicle for testing the vehicle brakes, comprising a cylinder having heads at both ends, a piston rod in the form of a tube slidably projecting through one of said heads and carrying a piston within the cylinder, the other of said heads being provided with means for connection to the brake pedal, a bracket pivotally connected to said tube outwardly of said one head, shoes carried by said bracket for clamping opposite portions of the vehicle steering post when the bracket is tilted to hold said piston rod or tube against movement in one direction, means for admitting fluid under pressure through said tube into said cylinder for extending the cylinder and piston rod, the construction and operation being such that admission of fluid under pressure into said cylinder will first shift the piston rod outwardly to tilt said shoes into holding engagement with the post to check further movement of the piston rod and then with the piston rod checked cause movement of the cylinder along the piston rod to depress the pedal, said shoes gravitationally releasing holding engagement with the post on cessation of fluid pressure in the cylinder.

JACOB L. SHROYER.